(No Model.)

J. J. MOORE.
TRACTION ENGINE CAB.

No. 537,217. Patented Apr. 9, 1895.

Witnesses
V. M. Hood.
M. V. Hood.

Inventor
Jonathan J. Moore.

By Attorney
H. P. Hood.

UNITED STATES PATENT OFFICE.

JONATHAN J. MOORE, OF THORNTOWN, INDIANA.

TRACTION-ENGINE CAB.

SPECIFICATION forming part of Letters Patent No. 537,217, dated April 9, 1895.

Application filed September 12, 1894. Serial No. 522,799. (No model.)

*To all whom it may concern:*

Be it known that I, JONATHAN J. MOORE, a citizen of the United States, residing at Thorntown, in the county of Boone and State of Indiana, have invented a new and useful Improvement in Traction-Engine Cabs, of which the following is a specification.

My invention relates to an improved cab for traction-engines.

The object of my improvement is to provide a cab for the protection of the driver of a traction-engine, which shall avoid the jolting of the driver when moving along rough roads, and which shall be easily detachable from the body of the machine when used as a stationary engine.

The accompanying drawings illustrate my invention.

Figure 1:
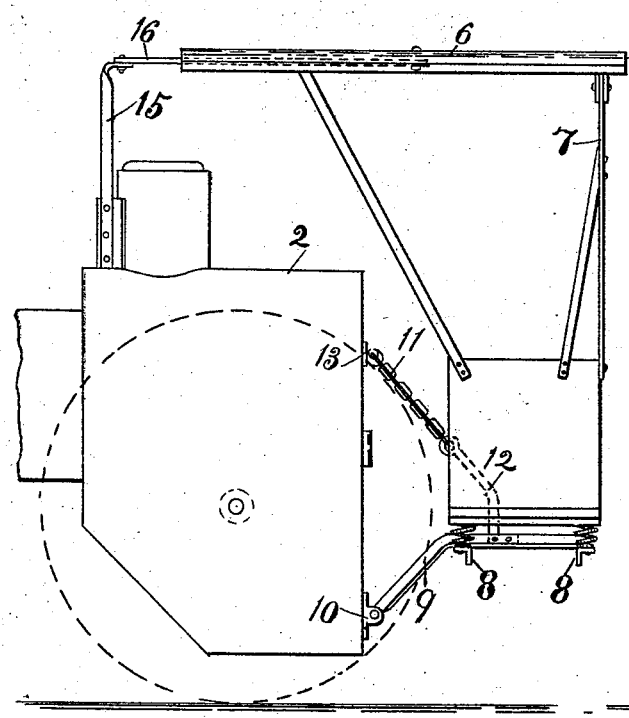
Figure 2:
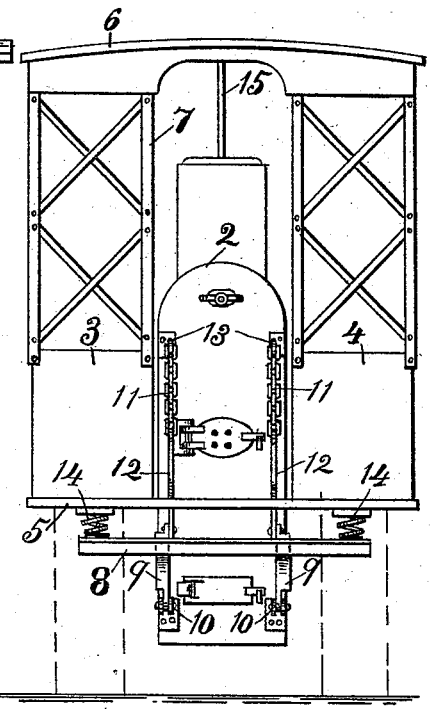

Figure 1 represents a side elevation. Fig. 2 represents an end elevation.

In the drawings, 2, indicates the rear part of the boiler and the fire-box of a traction engine.

The cab consists of a pair of rectangular tanks, 3, and 4, which are used for carrying water and fuel, and which are mounted upon the opposite ends of a platform, 5, and a roof, 6, which is supported above the tanks and secured thereto by a light iron frame-work, 7. Said cab is attached to the boiler and furnace front by means of a platform consisting of a pair of cross-bars, 8, 8, formed preferably of angle-iron, and a pair of bent arms, 9, 9, which are rigidly secured to the cross-bars, and are pivoted at one end to lugs, 10, 10, which are secured to the furnace front. The open frame-work thus formed is suspended in a horizontal position by means of chains, 11, 11, which are attached to brackets, 12, projecting upward from the frame, the chains being attached at the other end to hooks, 13, secured to the front of the boiler. The ends of cross-bars 8 support spiral springs, 14, 14, upon which the cab rests.

The roof of the cab is connected with a standard, 15, projecting upward from the top of the boiler, by means of a horizontal bar, 16, which is pivoted at one end to the standard so as to swing thereon in a horizontal plane, and, extending along the under side of the roof of the cab, is pivoted thereto at about the center of the roof, thus permitting a slight lateral swaying of the cab but preventing a backward and forward movement.

The cab being constructed and suspended in the above manner the engine driver is protected from the weather, and is also protected from the severe jolting of the engine in moving over rough roads.

When it is desirable to dismount the cab from the engine, as when the engine is to be used permanently for a long time in one place as a stationary engine, it is only necessary to dismount bar 16 at one end, remove the bolts connecting arms 9 9 and lugs 10 10, and unhook the chains 11 11.

I claim as my invention—

The combination of the boiler of a traction engine, the frame provided with a pair of arms pivoted to the boiler front and suspended therefrom in a horizontal position substantially as set forth, springs carried by said frame, a cab or housing consisting of a platform mounted upon said springs the tanks mounted on the opposite ends of said platform, the frame-work erected upon said tanks, and the roof secured to said frame-work, the standard erected upon said boiler, and the bar pivoted to said standard and to said roof so as to swing horizontally thereon, all arranged to co-operate substantially as set forth.

JONATHAN J. MOORE.

Witnesses:
H. P. HOOD,
V. M. HOOD.